United States Patent
Doane et al.

(10) Patent No.: US 8,017,553 B2
(45) Date of Patent: *Sep. 13, 2011

(54) SUPERABSORBENT POLYMERS IN AGRICULTURAL APPLICATIONS

(75) Inventors: William McKee Doane, Morton, IL (US); Steven William Doane, Lebanon, OR (US); Milan H. Savich, Beaverton, OR (US)

(73) Assignee: Absorbent Technologies, Inc., Beaverton, OR (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/264,698

(22) Filed: Nov. 4, 2008

(65) Prior Publication Data

US 2009/0069185 A1    Mar. 12, 2009

Related U.S. Application Data

(62) Division of application No. 12/018,090, filed on Jan. 22, 2008, now Pat. No. 7,459,501, which is a division of application No. 11/213,563, filed on Aug. 26, 2005, now abandoned.

(60) Provisional application No. 60/604,894, filed on Aug. 27, 2004.

(51) Int. Cl.
*A01N 25/26* (2006.01)
*C08F 297/02* (2006.01)
*C09D 103/04* (2006.01)

(52) U.S. Cl. ........ 504/100; 428/327; 428/402; 428/403; 525/54.3; 525/330.1; 525/360; 527/103; 527/312; 504/113

(58) Field of Classification Search ............. 428/327, 428/402, 403; 525/54.3, 330.1, 360; 527/103, 527/312; 504/100, 113
See application file for complete search history.

(56) References Cited

U.S. PATENT DOCUMENTS

| | | |
|---|---|---|
| 3,935,099 A | 1/1976 | Weaver et al. |
| 4,076,663 A | 2/1978 | Masuda et al. |
| 4,093,542 A | 6/1978 | Dahmen et al. |
| 4,113,685 A | 9/1978 | Hubner et al. |
| 4,134,863 A | 1/1979 | Fanta et al. |
| 4,155,888 A | 5/1979 | Mooth |
| 4,323,487 A | 4/1982 | Jones et al. |
| 4,367,297 A | 1/1983 | Hubner et al. |
| 4,408,073 A | 10/1983 | Goossens et al. |
| 4,528,350 A | 7/1985 | Goossens et al. |
| 4,711,919 A | 12/1987 | Peppmöller et al. |
| 4,766,173 A | 8/1988 | Bailey et al. |
| 4,773,967 A | 9/1988 | Peppmöller et al. |
| 4,983,390 A | 1/1991 | Levy |
| 5,118,719 A | 6/1992 | Lind |
| 5,122,544 A | 6/1992 | Bailey et al. |
| 5,147,343 A | 9/1992 | Kellenberger |
| 5,154,713 A | 10/1992 | Lind |
| 5,176,797 A | 1/1993 | Hartan et al. |
| 5,292,404 A | 3/1994 | Hartan et al. |
| 5,350,799 A | 9/1994 | Woodrum et al. |
| 5,512,646 A | 4/1996 | Hartan et al. |
| 5,567,478 A | 10/1996 | Houben et al. |
| 5,821,286 A | 10/1998 | Xu et al. |
| 5,856,370 A | 1/1999 | Chmelir |
| 5,965,149 A | 10/1999 | Silver |
| 6,048,467 A | 4/2000 | Dahmen et al. |
| 6,221,832 B1 | 4/2001 | Casteel et al. |
| 6,228,964 B1 | 5/2001 | Hartan et al. |
| 6,232,285 B1 | 5/2001 | Casteel et al. |
| 6,303,560 B1 | 10/2001 | Hartan et al. |
| 6,660,819 B2 | 12/2003 | Chmelir et al. |
| 6,800,712 B2 | 10/2004 | Doane et al. |
| 7,009,020 B2 | 3/2006 | Doane et al. |
| 7,459,501 B2 | 12/2008 | Doane et al. |
| 2003/0020043 A1 | 1/2003 | Barresi et al. |
| 2004/0068073 A1 | 4/2004 | Doane et al. |
| 2004/0074271 A1 | 4/2004 | Krysiak et al. |
| 2006/0047068 A1 | 3/2006 | Doane et al. |
| 2008/0113866 A1 | 5/2008 | Doane et al. |

FOREIGN PATENT DOCUMENTS

WO   PCT/US2005/030361    8/2005

OTHER PUBLICATIONS

United States Departmetn of Agriculture, "Starch-Encapsulated Pesticides", Agricultural Research Service, Nov. 1994; ARS Papers presented at the International Seminar on Research and Development of Controlled-Release Formulations of Pesticides—Vienna, Austria, Sep. 6-10, 1993.

Finkenstadt et al., "Reactive Extrusion of Starch-Polyacrylamide Graft Copolymers: Effects of Momoner/Starch Ratio and Moisture Content," Macromolecular Chemistry and Physics, vol. 206, Issue 16, published Aug. 19, 2005, pp. 1648-1652.

Athawale et al., "Recent Trends in Hydrogels Based on Starch-Graft-Acrylic Acid: A Review,"Starch/Starke, vol. 53, 2001, pp. 7-13.

Athawale et al. "Factors Influencing Absorbent Properties of Saponified Starch-g-(acrylic acid-co-acrylamide),"Journal of Applied Polymer Science, vol. 77, Issue 11, 2000, pp. 2480-2485.

(Continued)

*Primary Examiner* — Milton I Cano
*Assistant Examiner* — Gennadiy Mesh
(74) *Attorney, Agent, or Firm* — Stoel Rives LLP

(57) ABSTRACT

Superabsorbent polymer (SAP) products for use in agricultural applications, and methods of making and using the same are disclosed. Certain of the SAPs include a monomer or a mixture of monomers, selected from acrylic acid, acrylamide, acrylonitrile, methacrylamide, 2-acryloamido-2-methyl-propanesulfonic acid, methacrylic acid, vinyl sulfonic acid, ethyl acrylate, potassium acrylate, derivatives thereof or mixtures thereof, that is graft polymerized onto a starch in the presence of an initiator to form a starch graft copolymer.

6 Claims, 3 Drawing Sheets

OTHER PUBLICATIONS

Zhang et al., "Perspectives on : Strategies to Fabricate Starch-based Hydrogels with Potential biomedical Applications," Journal of Bioactive and Compatible Polymers, vol. 20, No. 3, May 2005, pp. 297-314.
Willett et al., "Preparation of Starch-Graft-Polyacrylamide Copolymers by Reactive Extrusion", Polymer Engineering and Science, vol. 43, No. 10, Oct. 2003, pp. 1666-1674.
Office Action dated Mar. 19, 2007 for U.S. Appl. No. 11/013,664.
Office Action dated Aug. 8, 2007 for U.S. Appl. No. 11/013,664.
Office Action dated Dec. 5, 2007 for U.S. Appl. No. 11/013,664.
Office Action dated Dec. 5, 2007 for U.S. Appl. No. 11/500,698.
Office Action dated Jan. 11, 2008 for U.S. Appl. No. 11/269,214.
Office Action dated Mar. 19, 2007 for U.S. Appl. No. 11/500,698.
Office Action dated Aug. 2, 2007 for U.S. Appl. No. 11/500,698.
U.S. Appl. No. 11/213,563, filed Aug. 26, 2005, Doane et al.
Office Action dated Sep. 17, 2007 for U.S. Appl. No. 11/269,214.
Office Action dated Jan. 16, 2007 for U.S. Appl. No. 11/269,214.
PCT Search Report dated Apr. 2, 2008, for PCT/US20005/30361.
Office Action dated Oct. 22, 2007 for U.S. Appl. No. 11/213,563.
Response to Office Action dated Oct. 9, 2007 for U.S. Appl. No. 11/213,563.
Office Action dated May 9, 2007 for U.S. Appl. No. 11/213,563.
Response to Election Restriction dated Apr. 19, 2007 for U.S. Appl. No. 11/213,563.
Requirement for Election Restriction dated Mar. 19, 2007 for U.S. Appl. No. 11/213,563.
Response to Office Action dated Sep. 3, 2008 for U.S. Appl. No. 12/018,090.
Office Action dated Aug. 19, 2008 for U.S. Appl. No. 12/018,090.
Response to Office Action dated Apr. 11, 2008 for U.S. Appl. No. 11/269,214.
Response to Office Action dated Jun. 18, 2007 for U.S. Appl. No. 11/269,214.
Response to Office Action dated Jun. 5, 2008 for U.S. Appl. No. 11/500,698.
Response to Office Action dated May 30, 2008 for U.S. Appl. No. 11/500,698.
Response to Office Action dated Apr. 7, 2008 for U.S. Appl. No. 11/500,698.
Response to Office Action dated Oct. 31, 2007 for U.S. Appl. No. 11/500,698.
Response to Office Action dated Jul. 19, 2007 for U.S. Appl. No. 11/500,698.
Response to Office Action dated Jun. 5, 2008 for U.S. Appl. No. 11/013,664.
Response to Office Action dated May 30, 2008 for U.S. Appl. No. 11/013,664.
Response to Office Action dated Apr. 4, 2008 for U.S. Appl. No. 11/013,664.
Response to Office Action dated Oct. 31, 2007 for U.S. Appl. No. 11/013,664.
Response to Office Action dated Jul. 19, 2007 for U.S. Appl. No. 11/013,664.

SUPERABSORBENT POLYMERS IN AGRICULTURAL APPLICATIONS

RELATED APPLICATIONS

This application is a divisional of U.S. application Ser. No. 12/018,090 now U.S. Pat. No. 7,459,501, filed Jan. 22, 2008 and entitled SUPERABSORBENT POLYMERS IN AGRICULTURAL APPLICATIONS, which is a divisional of now abandoned U.S. patent application Ser. No. 11/213,563, filed Aug. 26, 2005 and entitled SUPERABSORBENT POLYMERS IN AGRICULTURAL APPLICATIONS, which claims the benefit of U.S. Provisional Patent Application No. 60/604,894, filed Aug. 27, 2004 and entitled ALTERNATIVE MONOMERS FOR USE IN PREPARING A SUPERABSORBENT POLYMER PRODUCT, all of which are incorporated herein by reference.

TECHNICAL FIELD

The present disclosure relates to a superabsorbent polymer product and to methods of making and applying the superabsorbent polymer product.

BACKGROUND

Superabsorbent polymers (SAPs) are materials that imbibe or absorb at least 10 times their own weight in aqueous fluid and that retain the imbibed or absorbed aqueous fluid under moderate pressure. The imbibed or absorbed aqueous fluid is taken into the molecular structure of the SAP rather then being contained in pores from which the fluid could be eliminated by squeezing. Some SAPs can absorb up to 1,000 times their weight in aqueous fluid.

One method of producing a SAP for use in agricultural applications involves graft polymerizing acrylonitrile onto a starch in the presence of an initiator, such as a ceric (+4) salt, to form a starch graft copolymer, and saponifying the nitrile groups with an alkali metal to form a saponificate having alkali carboxylate and carboxamide groups.

Saponification, however, may require expensive machinery and generates ammonia, which can be corrosive, costly to remove, and expensive to dispose of. Also, potassium hydroxide (KOH) added during saponification makes the saponified starch graft copolymer mixture basic. Acid, e.g., hydrochloric acid, nitric acid, sulfuric acid, or phosphoric acid, is added to the mixture in order to neutralize the pH of the starch graft copolymer mixture. If the amount of acid that must be added is significant, the absorbency of the SAP is reduced. The resulting waste solutions may also be expensive to dispose of because they include potassium and ammonium salts and other extraneous salts. Furthermore, acrylonitrile may be hazardous and expensive to dispose of.

BRIEF SUMMARY

The present disclosure presents superabsorbent polymer (SAP) products for use in agricultural applications, methods of producing SAP products and methods of use.

Certain methods of producing SAP products disclosed do not require the use of acrylonitrile as a monomer and does not require the step of saponification. According to one embodiment, the method involves (1) graft polymerizing a monomer, other than acrylonitrile, onto a starch in the presence of an initiator to form a starch graft copolymer; (2) cross-linking the starch graft copolymer, for example, by adding a cross-linking agent, such as methylene bis-acrylamide; and (3) isolating the starch graft copolymer. The disclosed method may also include adjusting the pH of the cross-linked starch graft copolymer. Moreover, the method may further include drying the starch graft copolymer, to yield particles that are superabsorbent. The isolation of particles of superabsorbent polymer product may occur by various methods, including, but not limited to, granularization, extrusion, and pelletization.

Certain methods of increasing crop production using a SAP produced by the above-described method are disclosed. One method involves applying the SAP directly to the soil. A second method involves coating a root or seed with the SAP. A third method involves forming a slurry of SAP and water (or another liquid) and applying the resulting slurry to a plant, root, seed, seedling, or directly to soil into which one of a plant, root, seed, or seedling will be planted.

Certain SAP products for use in agricultural applications are also disclosed. The SAP product may include a polysaccharide, such as starch or cellulose, which has a monomer graft polymerized thereto. The monomer may be, for example, acrylic acid or methacrylic acid. The monomer may also be acrylamide or methacrylamide. A sulfonic acid, such as 2-acrylamido-2-methyl-propanesulfonic acid (AMPS) and vinyl sulfonic acid may also suffice. Moreover, acrylates, such as ethyl acrylate and potassium acrylate may also be used. Derivatives and mixtures of the above-listed monomers may also be desirable.

DETAILED DESCRIPTION

Figure 1:
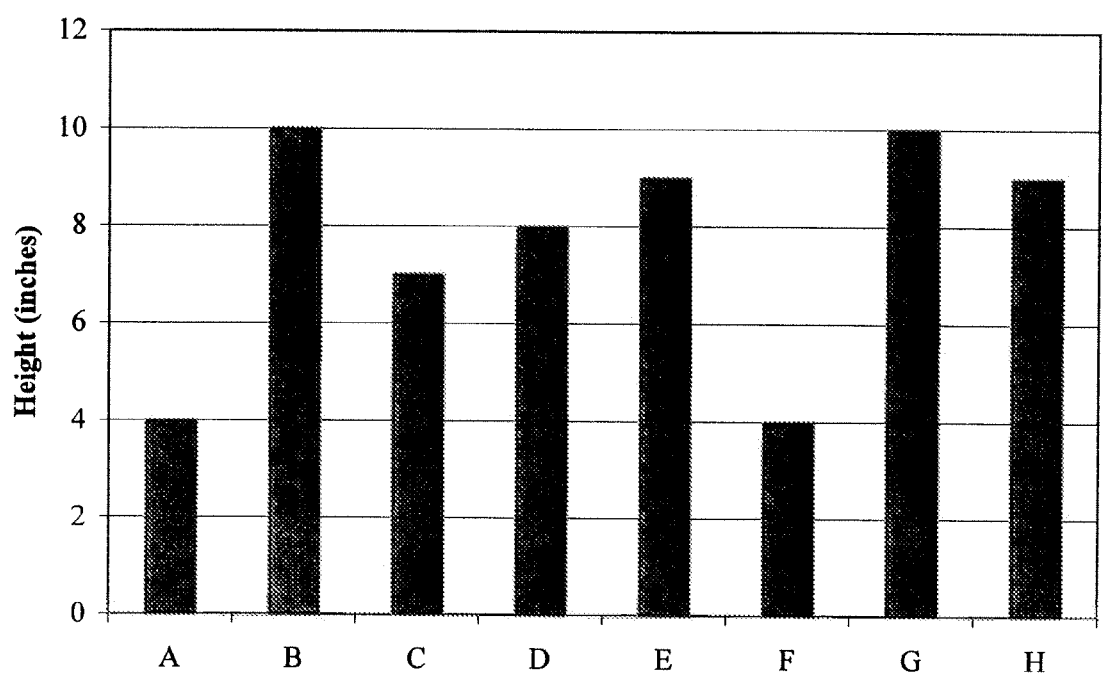
FIG. 1 is a graph depicting a comparison of sample height according to growth results described in Table 1.

Those skilled in the art will recognize that the methods and compositions disclosed herein may be practiced without one or more of the specific details described, or with other methods, components, materials, etc. In some cases, well-known materials, components or method steps are not shown or described in detail. Furthermore, the described method steps, compositions, etc., may be combined in any suitable manner in one or more embodiments. It will also be readily understood that the methods and compositions of the embodiments as generally described herein could be arranged and designed in a wide variety of different configurations.

The order of the steps or actions of the methods described in connection with the embodiments disclosed may be changed as would be apparent to those skilled in the art. Thus, any order in the detailed description is for illustrative purposes only and is not meant to imply a required order.

One embodiment of a method of making a superabsorbent polymer (SAP) for use in large-scale agricultural applications comprises (1) graft polymerizing a monomer onto a starch in the presence of an initiator to form a starch graft copolymer; (2) cross-linking the starch graft copolymer, for example, by adding a cross-linking agent, such as methylene bis-acrylamide to cross-link the starch graft copolymer; (3) adjusting the pH of the cross-linked starch graft copolymer, such as neutralization; (4) isolating the cross-linked starch graft copolymer; and (5) drying the cross-linked starch graft copolymer.

Exemplary monomers for use in the above-described method include acrylic acid or methacrylic acid. Exemplary monomers may also include acrylamide or methacrylamide. Sulfonic acids, such as 2-acrylamido-2-methyl-propanesulfonic acid (AMPS) and vinyl sulfonic acid may also be used. Moreover, acrylates, such as ethyl acrylate and potassium acrylate may also be used. Derivatives and mixtures of the above-listed monomers may also be desirable.

For example, in some applications it may be desirable to use acrylic acid as the monomer. In other applications it may be desirable to use a mixture of acrylic acid and acrylamide to be graft polymerized onto a starch. In other alternative applications, it may be desirable to use 2-acrylamido-2-methyl-propanesulfonic acid.

In applications using acrylic acid, the addition of acrylamide thereto helps induce graft polymerization and adds to absorbency of the SAP. By way of example, the ratio by weight of acrylic acid to acrylamide may be about 2:1. Alternatively, the ratio of acrylic acid to acrylamide may also range up to a ratio of 9:1 and beyond. Because acrylamide is considered a neurotoxin, it may be desirable to reduce the relative amount of acrylamide to acrylic acid, while using enough to help induce graft polymerization of acrylic acid.

In alternative applications, acrylic acid may graft polymerize onto a starch or other polysaccharide without the assistance of acrylamide. For example, acrylic acid may polymerize when placed under heat and/or pressure. Polymerization without the addition of acrylamide may be accomplished, for example, in a heated screw extruder, such as a single screw or a double screw.

The starches used in the above-described method include starches, flours, and meals. More specifically, exemplary starches include native starches (e.g., corn starch (Pure Food Powder, manufactured by A.E. Staley), waxy maize starch (Waxy 7350, manufactured by A.E. Staley), wheat starch (Midsol 50, manufactured by Midwest Grain Products), potato starch (Avebe, manufactured by A.E. Staley)), dextrin starches (e.g., Stadex 9, manufactured by A.E. Staley), dextran starches (e.g., Grade 2P, manufactured by Pharmachem Corp.), corn meal, peeled yucca root, unpeeled yucca root, oat flour, banana flour, and tapioca flour. The starch may be gelatinized to provide optimal absorbency. An exemplary starch is gelatinized cornstarch. Furthermore, according to one embodiment, the weight ratio of the starch to the monomer is in the range of between about 1:1 and about 1:6.

In alternative embodiments, other polysaccharides, such as cellulose, may be used instead of starch. Accordingly, the monomers heretofore described may be graft polymerized onto cellulose for purposes of agricultural applications.

The monomer may be graft polymerized onto a starch in the presence of an initiator. Exemplary initiators for use in the above-described method include: cerium (+4) salts, such as ceric ammonium nitrate; ammonium persulfate; sodium persulfate; potassium persulfate; ferrous peroxide; ferrous ammonium sulfate-hydrogen peroxide; L-ascorbic acid; and potassium permanganate-ascorbic acid. Other suitable initiators known to those skilled in the art may be used, such as alternative persulfates and peroxides, as well as vanadium, manganese, etc. The amount of initiator used may vary based on the chosen initiator, the selected monomer, and the chosen starch. Some initiators, e.g., persulfates, may require the presence of heat. The initiator may be added in a single or multiple steps, and multiple initiators may be used.

A cross-linking agent may be added to the mixture to form a cross-linked starch graft copolymer. It may be desirable for the starch graft copolymer to be cross-linked if it dissolves in aqueous fluids previous to being cross-linked. Cross-linking is one method to permit the starch graft copolymer to absorb aqueous fluids without dissolving. However, the amount of cross-linking agent added is typically indirectly proportional to the absorbency of the resulting SAP product. Exemplary cross-linking agents include: glycerides; diepoxides; diglycidyls; cyclohexadiamide; methylene bis-acrylamide; bis-hydroxyalkylamides, such as bis-hydroxypropyl adipamide; formaldehydes, such as urea-formaldehyde and melamine-formaldehyde resins; isocyanates including di- or tri-isocyanates; epoxy resins, typically in the presence of a base catalyst; and derivatives and mixtures thereof.

Alternative methods of cross-linking may also be employed. For example, a solid SAP product may be cross-linked through irradiation, such as exposure to gamma or x-ray electromagnetic radiation, or to an electron beam and the like. Irradiation facilitates cross-linking of the starch graft copolymer by creating free radicals in the copolymer chain. In some applications, after irradiation an annealing or melting process may be used in re-forming the cross-linked copolymer chains. Furthermore, it may be desirable to perform the irradiation process in an atmosphere relatively free of oxygen.

Although the addition of cross-linking agents may be desirable in the production of SAPs, self-cross-linking copolymers may also be used. In a self-cross-linking copolymer, either a single self-reactive functional group or multiple self-reactive functional groups or multiple co-reactive functional groups are incorporated into the mixture. One exemplary co-reactive functional group is a copolymer of acrylic acid and glycidyl methacrylate.

Once a cross-linked starch graft copolymer is formed, the pH of the cross-linked starch graft copolymer may be adjusted to a desired value for the particular agricultural application. For example, the cross-linked starch graft copolymer may be neutralized to convert the carboxyl groups to potassium salts. Alternative pH values may be desirable depending upon the type of soil and the type of crop the resulting SAPs will be applied to. The resulting pH for most agricultural applications typically will range from about 6.0 to about 8.0. The desired pH may be greater or less than this range depending on the requirements for the particular agricultural application.

Alternatively, in some embodiments, pH adjustment of the starch graft copolymer may occur prior to cross-linking. In contrast to some alternative methods which require saponification, the step of pH adjustment/neutralization may be significantly faster, easier, and less expensive compared to saponification. Furthermore, adjusting the pH does not necessarily produce corrosive and dangerous reaction by-products such as ammonia. Exemplary solvents that may be used to effect pH adjustment include potassium hydroxide, potassium methoxide, or a mixture thereof, any of which may optionally be diluted in methanol or other solvents.

In alternative embodiments, pH adjustment may not be necessary. For instance, if potassium acrylate were used as the monomer in lieu of acrylic acid, the resulting product may already be within an acceptable pH range.

In one embodiment, the resulting pH adjusted, cross-linked starch graft copolymer may then be isolated. One exemplary method of isolation involves simply drying the cross-linked starch graft copolymer, such as, for example, on a heated drum or via air-drying. The dried SAP product may then be pelletized according to pelletization methods known to those having skill in the art.

Compared to some alternative methods of producing SAPs which require the step of saponification, the method described herein provides a pH-adjusted, cross-linked starch graft copolymer reaction mass having very little extraneous salt. Consequently, isolation can be effected through the step of drying the SAP product in an alcohol-free environment. In contrast, methods that require saponification result in starch graft copolymers having a significant amount of extraneous salt and ammonia and thus must be treated with methanol. The use of methanol may add significantly to the cost of producing the SAP product because methanol disposal can be expensive.

In another embodiment, the step of isolating the starch graft copolymer involves extruding the cross-linked starch graft copolymer such as through a heated screw to form granules of SAP product. To minimize re-agglomeration of the granules, the granules may be coated with a dusting agent that decreases their propensity to stick together. Exemplary dusting agents include cellulose, clay, starch, flour, and other natural or synthetic polymers that prevent the granules from sticking together. Alternatively, the granules may be lightly sprayed with methanol to prevent them from sticking together, and/or the extrusion can be performed under high pressure.

Yet another exemplary method of isolating the starch graft copolymer involves precipitating the pH-adjusted, cross-linked starch graft copolymer using water-miscible solvents such as alcohols, e.g., methanol, ethanol, propanol, and isopropanol. Immersing the cross-linked starch graft copolymer in alcohol may cause the alkali starch graft copolymer to precipitate into particles that are later screened to the desired size after drying. The alcohol removes the water and extraneous salts from the cross-linked starch graft copolymer.

Another exemplary implementation of this method of precipitation involves blending sufficient methanol into the pH-adjusted, cross-linked starch graft copolymer to achieve a smooth dispersion. The smooth dispersion may then be pumped into a precipitation tank, which may include a stirring system that can vigorously mix the methanol while pumping in the smooth cross-linked starch graft copolymer dispersion. Once mixed, the resulting methanol and cross-linked starch graft copolymer particles may be collected by decanting or washing with methanol or centrifuged and collected, then dried to a moisture level of between about 1 percent and about 20 percent.

A third implementation of the isolation step through precipitation with methanol involves wetting the surface of the cross-linked starch graft copolymer with a small amount of methanol and then chopping the cross-linked starch graft copolymer into larger "chunks" that will not re-adhere to one another. Once the surface of the cross-linked starch graft copolymer has been wetted with methanol, the resulting material is slippery to the touch and is no longer sticky. This effect may be achieved by using a compositional ratio of between about one part and about two parts of methanol per one part of solid.

Once the methanol has been added, the cross-linked starch graft copolymer may be pumped through an in-line chopper to form chunks having a diameter of less than one inch or, alternatively, hand-chopped with scissors. The resulting mixture is then fed into a tank or Waring blender that has between about 1.5 gallons and about 2.0 gallons of additional methanol per pound of cross-linked starch graft copolymer. In some embodiments, the cross-linked starch graft copolymer may be subject to a pulverizer, such as an in-line mixer or disintegrator which breaks the mass into smaller pieces as desired for the particular application. The methanol in the larger tank may be agitated with a Cowles dissolver or other mixer capable of achieving high speeds.

A fourth implementation of the isolation step through precipitation with methanol involves pre-forming the particle size before the methanol precipitation step. The use of dies to form strands or rods having different shapes and diameters can greatly improve the particle size formation process. This fourth implementation offers enhanced control of the final particle size. The cross-linked starch graft copolymer (neutralized or unneutralized) may be forced through a die plate having holes of varying diameter (e.g., about $\frac{1}{16}$ inch to more than $\frac{1}{4}$ inch) and varying shape (e.g., round, star, ribbon, etc.).

Methods of forcing the cross-linked starch graft copolymer through the die plate include using a hand-operated plunger, screw-feeding, auguring, pumping, and any other commonly known method. The resulting strands or rods may be placed into the precipitation tank without any further addition of methanol as a premixing agent. The strands or rods may be treated to prevent them from sticking together by, for example, wetting or spraying the strands or rods with methanol or dusting them with a dusting agent, such as, for example, cellulose, clay, starch, flour, or other natural or synthetic polymers. The resulting strands or rods may be precipitated with agitated methanol, removed from the tank, and dried.

Another step in the method of preparing a SAP includes forming the isolated, cross-linked starch graft copolymer into the desired size of particles and drying. The SAP product may have a particle size of less than about 200 mesh. The desirable particle size may depend on the specific agricultural application intended. In one embodiment for agricultural applications that deposit the starch graft copolymer directly into the soil, the particle size may be less than 50 mesh, more particularly between about 5 mesh and 50 mesh, or between about 5 mesh and 25 mesh, or between about 8 mesh and about 25 mesh. This particle size is typically compatible with commercially available granular applicators in the industry. To broadcast or meter the absorbent particles through most existing application equipment, an about 8 mesh to about 25 mesh SAP product having a density of between about 30 pounds and about 35 pounds per cubic foot may be used.

Other agricultural applications, such as seed coating and root dipping, may use a finer particle size. For seed coating, the desired particle size may be between about 75 mesh and about 300 mesh, such as about 200 mesh. For root dipping, the desired particle size may be between about 30 mesh and about 100 mesh, such as about 50 mesh.

Alternatively, the cross-linked cross-linked starch graft copolymer product may be mixed with a solvent, such as water, to form a slurry. The resulting slurry may be applied to an agricultural medium such as a plant, root, seed, seedling, or directly to soil into which one of a plant, root, seed, or seedling will be planted.

One exemplary method by which the desired size of particles may be formed involves converting the cross-linked starch graft copolymer into rod-shaped forms and drying the forms to the desired particle size. Die selection typically dictates the size and shape of the rod-shaped forms. The diameter of the rods is controlled by drilling holes in the end plate, such as $\frac{1}{16}$-inch to $\frac{1}{4}$-inch in diameter. For example, the die would be a plate that has been drilled or formed to contain holes of the selected size and shape.

Following extrusion from the die, the rod-shaped forms may be lightly coated with a dusting agent that decreases their propensity to stick together and reduces their tackiness. Exemplary dusting agents include cellulose, clay, starch, flour, and other natural or synthetic polymers that prevent the rods from sticking together. Alternatively, the rods may be lightly sprayed with methanol, and/or they may be extruded from the die under pressure. The coated particles are then dried. Exemplary drying methods include air-drying or oven-drying. Following drying, the particles may be screened to the appropriate size.

In another exemplary method by which the desired size particles may be formed, the cross-linked starch graft copolymer may be ground to a fine powder and then formed into pellets of the desired size. Pelletizing is common in the polymer industry and is known to those of skill in the art. As described above, the resulting pellets may be lightly coated with a dusting agent that decreases their propensity to stick together and reduces their tackiness.

The SAP product made by the methods described herein may also be colored using any coloring method known to one of skill in the art, including, but not limited to, adding fertilizers and/or charcoal. Also, a fertilizer or micronutrient may be added to the SAP product. The fertilizer or micronutrient may be added once the granular SAP product is formed or at any stage during processing.

The agricultural application of SAPs made by the above-described methods may result in earlier seed germination and/or blooming, decreased irrigation requirements, increased propagation, increased crop growth, increased crop production, and decreased soil crusting. Thus SAPs made by the methods disclosed herein are desirable for forming and using a SAP in large-scale agricultural applications.

The following Examples 1-3 demonstrate exemplary procedures used to form a SAP product using the method(s) described herein:

Example 1

Deionized water (2,000 ml) was added to cornstarch (200 g; Cargill Gel Instant 12030, manufactured by Cargill Food and Pharma Specialties, Inc. of Cedar Rapids, Iowa) in a 3-liter resin kettle. The combination was mixed until a uniform mixture was formed. Acrylic acid (200 g; 99% purity; City Chemical, LLC of West Haven, Conn.) was added to the cooled mixture and the resulting mixture was stirred for approximately five minutes. Next, acrylamide (100 g; 99% purity; City Chemical, LLC of West Haven, Conn.) was added to the mixture, and the resulting mixture was stirred for approximately five minutes. Then methylene bis-acrylamide (0.5 g dissolved in 50 ml of deionized water; Molecular Grade; 99% purity; manufactured by Promega Corporation of Madison, Wis.) was added to the mixture, and the resulting mixture was stirred for approximately five minutes. Lastly, ammonium persulfate (0.5 g dissolved in 50 ml of deionized water; Molecular Grade; 99% purity; manufactured by Cascade Columbia Distribution Co. of Sherwood, Oreg.) was added to the mixture and the resulting mixture was stirred while being heated to approximately 170° F. The mixture was held at that temperature and stirred for approximately 15 minutes. The resulting white, viscous mass had a pH of 3.7, and a nitrogen test of a small sample of the viscous mass showed a nitrogen content of 3.58%.

Because the resulting viscous mass was acidic, the mixture was neutralized by titration with 45% potassium hydroxide (KOH) at room temperature. Titration continued until a pH of 7.0 was reached, which required addition of between about 160 g and 170 g of 45% KOH.

The cross-linked SAP product was then isolated by adding the neutral pH reaction mass to several gallons of methanol. The resulting cross-linked SAP product was dried in a tumble dryer such that a white, granular SAP product having a density of 6.6 grams per cubic inch, and a moisture content of 9.1% was formed. A nitrogen test of the SAP product showed a nitrogen content of approximately 3.19%. The SAP product exhibited the ability to imbibe or absorb between about 400 and about 500 times its weight in aqueous fluid and to retain the imbibed or absorbed aqueous fluid under moderate pressure.

Example 2

Deionized water (2,000 ml) was added to cornstarch (200 g; Corn Products #3005, Industrial Starch (pearl starch), manufactured by CPC International, Inc. of Westchester, Ill.) in a 3-liter resin kettle. The combination was mixed until a uniform mixture was formed. The mixture was then heated to between about 185° F. and about 190° F. using a heating jacket. The mixture was maintained at this temperature for approximately 30 minutes, at which time the heating jacket was turned off and the mixture was allowed to cool to 150° F.

Acrylic acid (200 g; 99% purity; City Chemical, LLC of West Haven, Conn.) was added to the cooled mixture and the resulting mixture was stirred for approximately five minutes. Next, acrylamide (100 g; 99% purity; City Chemical, LLC of West Haven, Conn.) was added to the mixture, and the resulting mixture was stirred for approximately five minutes. Then methylene bis-acrylamide (0.5 g dissolved in 50 ml of deionized water; Molecular Grade; 99% purity; manufactured by Promega Corporation of Madison, Wis.) was added to the mixture, and the resulting mixture was stirred for approximately five minutes. Lastly, ammonium persulfate (0.5 g dissolved in 50 ml of deionized water; Molecular Grade; 99% purity; manufactured by Cascade Columbia Distribution Co. of Sherwood, Oreg.) was added to the mixture and the resulting mixture was stirred while being heated to approximately 170° F. The mixture was held at that temperature and stirred for approximately 15 minutes. The resulting white, viscous mass had a pH of 3.7, and a nitrogen test of a small sample of the viscous mass showed a nitrogen content of 3.58%.

Because the resulting viscous mass was acidic, the mixture was neutralized by titration with 45% potassium hydroxide (KOH) at room temperature. Titration continued until a pH of 7.0 was reached, which required addition of between about 160 g and 170 g of 45% KOH.

The cross-linked SAP product was then isolated by adding the neutral pH reaction mass to several gallons of methanol. The resulting cross-linked SAP product was dried in a tumble dryer such that a white, granular SAP product was formed. The SAP product exhibited the ability to imbibe or absorb between about 400 and about 500 times its weight in aqueous fluid and to retain the imbibed or absorbed aqueous fluid under moderate pressure.

Example 3

Deionized water (2,000 ml) was added to pregelatinized yellow corn flour (200 g; #01965-00, manufactured by Cargill Dry Corn Ingredients, Inc. of Paris, Ill.) in a 3-liter resin kettle. The combination was mixed until a uniform mixture was formed. Acrylic acid (200 g; 99% purity; City Chemical, LLC of West Haven, Conn.) was added to the cooled mixture and the resulting mixture was stirred for approximately five minutes. Next, acrylamide (100 g; 99% purity; City Chemical, LLC of West Haven, Conn.) was added to the mixture, and the resulting mixture was stirred for approximately five minutes. Then methylene bis-acrylamide (0.5 g dissolved in 50 ml of deionized water; Molecular Grade; 99% purity; manufactured by Promega Corporation of Madison, Wis.) was added to the mixture, and the resulting mixture was stirred for approximately five minutes. Lastly, ammonium persulfate (0.5 g dissolved in 50 ml of deionized water; Molecular Grade; 99% purity; manufactured by Cascade Columbia Distribution Co. of Sherwood, Oreg.) was added to the mixture and the resulting mixture was stirred while being heated to approximately 170° F. The mixture was held at that temperature and stirred for approximately 15 minutes. The resulting white, viscous mass had a pH of 3.7, and a nitrogen test of a small sample of the viscous mass showed a nitrogen content of 3.58%.

Because the resulting viscous mass was acidic, the mixture was neutralized by titration with 45% potassium hydroxide (KOH) at room temperature. Titration continued until a pH of 7.0 was reached, which required addition of between about 160 g and 170 g of 45% KOH.

The cross-linked SAP product was then isolated by adding the neutral pH reaction mass to several gallons of methanol. The resulting cross-linked SAP product was dried in a tumble dryer such that a white, granular SAP product was formed. The SAP product exhibited the ability to imbibe or absorb between about 400 and about 500 times its weight in aqueous fluid and to retain the imbibed or absorbed aqueous fluid under moderate pressure.

The following Examples 4 and 5 are hypothetical examples that demonstrate exemplary procedures that may be used to form a SAP product using the method(s) described herein. While Examples 4 and 5 are hypothetical in nature they are based upon actual experimental designs that have been tested and/or contemplated.

Example 4

Deionized water (2,000 ml) is added to cornstarch (200 g) in a 3-liter resin kettle. The combination is mixed until a uniform mixture is formed. Acrylic acid (200 g; 99% purity) is added to the cooled mixture and the resulting mixture is stirred for approximately five minutes. Next, acrylamide (100 g; 99% purity) is added to the mixture, and the resulting mixture is stirred for approximately five minutes. Then methylene bis-acrylamide (0.5 g dissolved in 50 ml of deionized water; Molecular Grade; 99% purity) is added to the mixture, and the resulting mixture is stirred for approximately five minutes. Lastly, ammonium persulfate (0.5 g dissolved in 50 ml of deionized water; Molecular Grade; 99% purity) is added to the mixture and the resulting mixture is stirred while being heated to approximately 170° F. The mixture is held at that temperature and stirred for approximately 15 minutes.

The resulting mass is neutralized by titration with 45% potassium hydroxide (KOH) at room temperature. Titration continues until a pH of 7.0 is reached. The cross-linked SAP product is then dried in a tumble dryer.

Example 5

Deionized water (2,000 ml) is added to cornstarch (200 g) in a 3-liter resin kettle. The combination is mixed until a uniform mixture is formed. Acrylic acid (200 g; 99% purity) is added to the cooled mixture and the resulting mixture is stirred for approximately five minutes. Next, acrylamide (100 g; 99% purity) is added to the mixture, and the resulting mixture is stirred for approximately five minutes. Then methylene bis-acrylamide (0.5 g dissolved in 50 ml of deionized water; Molecular Grade; 99% purity) is added to the mixture, and the resulting mixture is stirred for approximately five minutes. Lastly, ammonium persulfate (0.5 g dissolved in 50 ml of deionized water; Molecular Grade; 99% purity) is added to the mixture and the resulting mixture is stirred while being heated to approximately 170° F. The mixture is held at that temperature and stirred for approximately 15 minutes.

The resulting mass is neutralized by titration with 45% potassium hydroxide (KOH) at room temperature. Titration continues until a pH of 7.0 is reached. The neutralized crosslinked starch graft copolymer is then screw-fed through a die plate having holes of varying diameter (between 1/16 inch to 1/4 inch). The resulting strands are dusted with cellulose as a dusting agent, to prevent the strands from sticking together. The resulting strands are then dried in a tumble dryer.

EXPERIMENTAL COMPARISON

The effectiveness of the SAP product formed using the method described in Example 1 was tested and analyzed in comparison to various alternative SAP products having varying particle sizes and in comparison to control subjects.

The general procedure for the testing was as follows. Eight one-gallon plastic pots having drainage holes were obtained. Six of the pots (Samples B-E, G, and H) were filled with a thoroughly combined mixture of 10 g of the selected SAP product and approximately 0.5 gallon of sand; two of the pots (Samples A and F) were control pots, which were filled with plain, untreated sand. The assignment of pots (A through H) occurred randomly. Sand, rather than dirt, was chosen as the growing medium because sand provides no nutrients for growing plants. Samples B-E, G, and H were formed as follows:

Sample B included an alternative SAP product having a particle size of about 10 to about 20 mesh and made using acrylonitrile as the monomer and yellow corn flour as the starch;

Sample C included the SAP product formed by the method described in Example 1 and having a particle size of about 8 to about 16 mesh;

Sample D included another alternative SAP product having a particle size of about 8 mesh and made using acrylonitrile as the monomer and cornstarch as the starch;

Sample E included yet another alternative SAP product having a particle size of about 10 to about 20 mesh and using acrylonitrile as the monomer and a 50/50 mixture of yellow corn flour and cornstarch as the starch;

Sample G included still another alternative SAP product having a particle size of greater than about 8 mesh and made using acrylonitrile as the monomer and cornstarch as the starch; and Sample H included the SAP product formed by the method described in Example 1 and having a particle size of between about 20 and about 40 mesh.

One six-inch-high geranium plant was planted in each of the filled pots, such that the final sand level in each pot was approximately one-inch below the rim of the pot. Approximately two liters of water were added to each pot; 24 hours later, another approximately two liters of water were added to each pot.

The pots were then placed in a plastic pool that was positioned under a fluorescent light source, such that the light source was approximately 14 inches above the tops of the geranium plants. The plastic pool was slightly rotated on a daily basis to ensure that each geranium plant received the same amount of light. Once per week, the plants were rearranged in the pool, to further ensure that each geranium plant received the same amount of light. The geranium plants received no additional water and were allowed to grow for 65 days. At the end of 65 days, the geranium plants were harvested and the following information was gathered:

TABLE I

Growth Results

| Sample | Height[Y] inches | Width[£] inches | Mass (g)* | Physical Description |
|---|---|---|---|---|
| A | 4 | 3 | 24.3 | Wilted, slightly yellowing, small leaves; little observable growth; minimal root growth |
| B | 10 | 9 | 55.7 | Healthy; observable new growth; large, green leaves; tall plant |
| C | 7 | 11 | 65.3 | Healthy; observable new growth; large, green leaves; bushy plant |
| D | 8 | 7 | 45.1 | Relatively healthy; observable new growth; large, green leaves on top and some yellow leaves on bottom; tall plant |
| E | 9 | 12 | 67.6 | Healthy, observable new growth; large, green leaves; bushy plant |
| F | 4 | 3 | 22.2 | Wilted, slightly yellowing, small leaves; little observable growth; minimal root growth |
| G | 10 | 12 | 53.4 | Healthy; observable new growth; large, green-and-yellow leaves; tall and bushy plant |
| H | 9 | 10 | 65.3 | Healthy; observable new growth; large, green leaves; tall and bushy plant |

[Y]Height of the plant is measured from the top of the sand to the top of the highest point of the plant.
[£]Width of the plant is measured from the widest points on either side of the plant.
*Mass includes the entire plant (roots, stem, and leaves).

Figure 2:
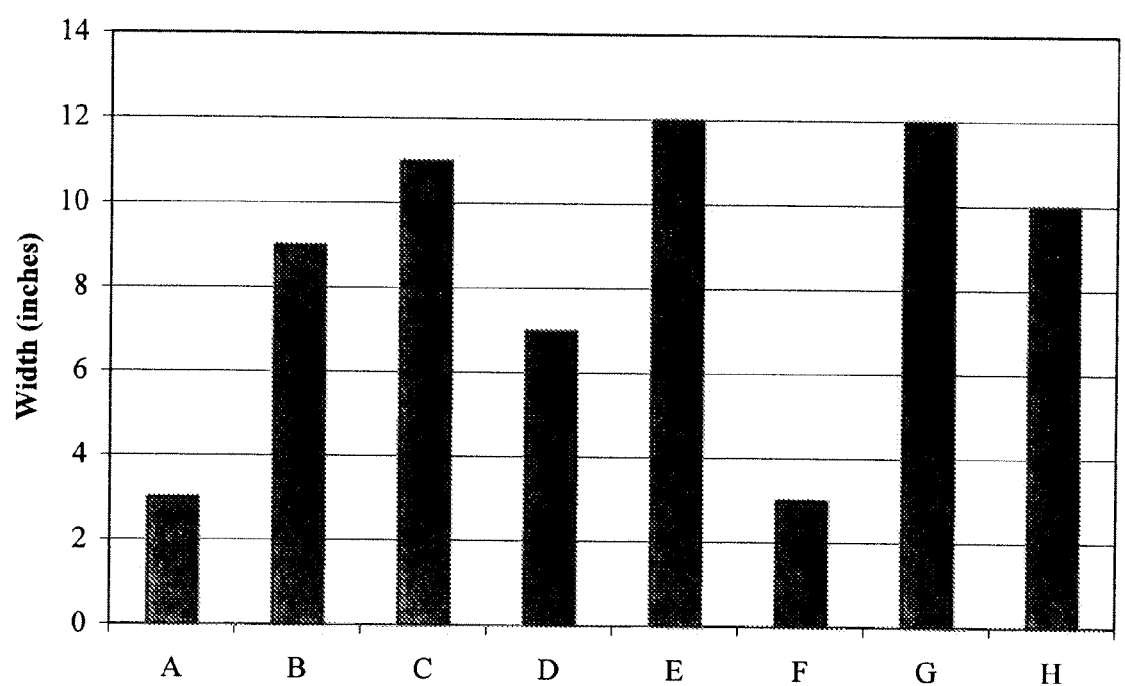
FIG. 2 is a graph depicting a comparison of sample width according to growth results described in Table 1.
Figure 3:
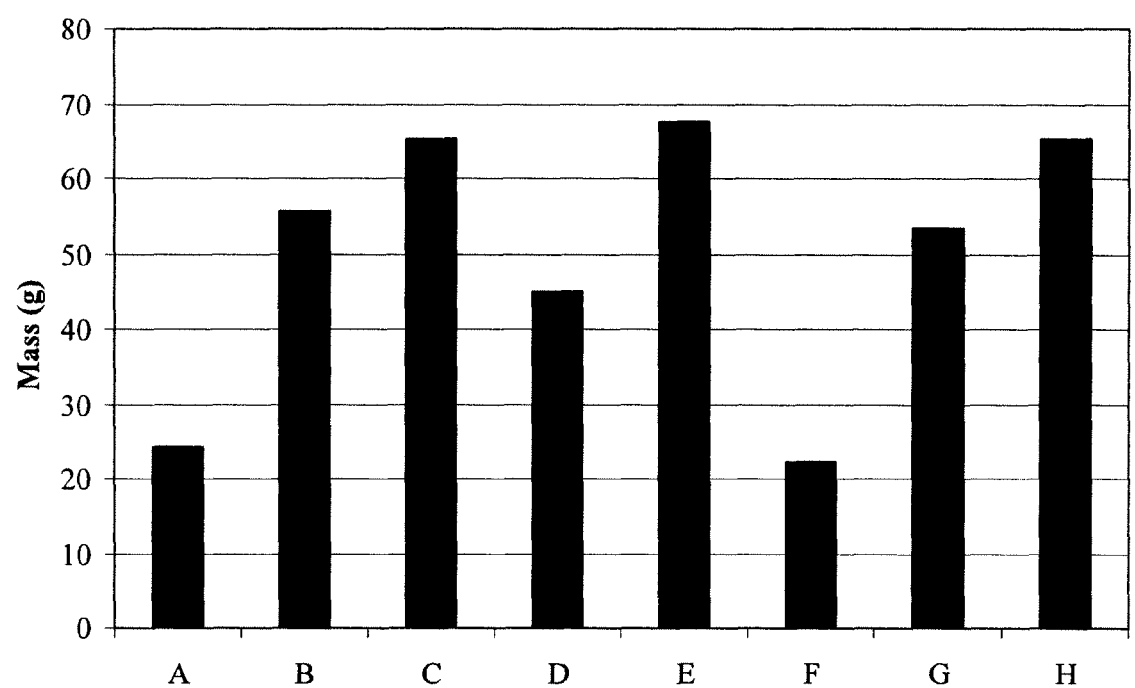
FIG. 3 is a graph depicting a comparison of sample mass according to growth results described in Table 1.

FIG. 1 is a graph representing the comparison of sample height, where the x-axis is each sample and the y-axis is the height in inches. The height of each plant is measured from the top of the sand to the top of the highest point of the plant. FIG. 2 is a graph representing the comparison of sample width, where the x-axis is the sample identity and the y-axis is the width of the sample in inches. The width of each plant is measured from the widest points on either side of the plant. FIG. 3 is a graph representing the comparison of sample mass, where the x-axis is the sample identity and the y-axis is the mass of each sample in grams. The mass includes the mass of the entire plant (roots, stem, and leaves).

FIGS. 1 through 3 show that Sample E, which included an alternative SAP product having a particle size of about 10 to about 20 mesh and using acrylonitrile as the monomer and a 50/50 mixture of yellow corn flour and cornstarch as the starch, had the greatest overall mass (67.6 g). However, Samples C and H, which both included the SAP product formed by the method described in Example 1, tied for the second greatest overall mass. Interestingly, there was no noticeable difference in overall mass based on the varying particle sizes used for Samples C and H. Most importantly, both Samples C and H showed significant growth as compared to the control samples (A and F).

It will be obvious to those having skill in the art that many changes may be made to the details of the above-described embodiments. Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed hereinafter.

What is claimed is:

1. A method for preparing a superabsorbent polymer seed coating, comprising:
    graft polymerizing a monomer onto a starch in the presence of an initiator to form a starch graft copolymer, wherein the monomer is at least one of the following: acrylic acid, acrylamide, acrylonitrile, methacrylamide, 2-acryloamido-2-methyl-propanesulfonic acid, methacrylic acid, vinyl sulfonic acid, ethyl acrylate, potassium acrylate, derivatives thereof or mixtures thereof;
    isolating the starch graft copolymer by extruding the starch graft copolymer into strands;
    applying an alcohol to the strands to reduce tackiness of the extruded strands, the alcohol chosen from: methanol, ethanol, propanol or isopropanol;
    forming granules of starch graft copolymer from the extruded strands; and
    screening the starch graft copolymer granules to select granules having a mesh size finer than about 75 mesh.

2. The method of claim 1, when the monomer is at least one of acrylic acid, acrylamide, methacrylamide, 2-acryloamido-2-methyl-propanesulfonic acid, methacrylic acid, vinyl sulfonic acid, ethyl acrylate, potassium acrylate, derivatives thereof or mixtures thereof, the method further comprising the addition of a cross-linking agent to cross-link the starch graft copolymer.

3. The method of claim 1, when the monomer is acrylonitrile, the method further comprising saponifying the starch graft copolymer.

4. The method of claim 1, wherein screening the starch graft copolymer granules to select granules comprises screening the starch graft copolymer granules to select granules between about 75 and about 300 mesh.

5. A method for coating a seed with a superabsorbent polymer, comprising:
    preparing a superabsorbent polymer seed coating according to the method of claim 1; and
    coating a seed with starch graft copolymer granules finer than about 75 mesh.

6. The method of claim 5, wherein coating the seed with granules comprises mixing the granules finer than about 75 mesh with a solvent to form a slurry, and applying the slurry to a seed.

* * * * *